(12) United States Patent
Van Dulmen et al.

(10) Patent No.: US 6,967,331 B2
(45) Date of Patent: Nov. 22, 2005

(54) METHOD OF IMAGING BY SPECT

(76) Inventors: Adrianus A. Van Dulmen, Schoutsakker 4, NL-1871, CZ Schoorl (NL); Stéphan Walrand, 31, rue de Baileux, B-5630, Silenrieux (BE)

( * ) Notice: Subject to any disclaimer, the term of this patent is extended or adjusted under 35 U.S.C. 154(b) by 186 days.

(21) Appl. No.: 10/181,211

(22) PCT Filed: Jan. 10, 2001

(86) PCT No.: PCT/EP01/00188

§ 371 (c)(1), (2), (4) Date: Dec. 17, 2002

(87) PCT Pub. No.: WO01/52269

PCT Pub. Date: Jul. 19, 2001

(65) Prior Publication Data

US 2003/0111608 A1 Jun. 19, 2003

(51) Int. Cl.⁷ .................................. G01T 1/61
(52) U.S. Cl. ................ 250/363.2; 250/363.1; 250/363.04
(58) Field of Search .................... 250/363.1, 363.02, 250/363.03, 363.04, 369

(56) References Cited

U.S. PATENT DOCUMENTS

| | | | | |
|---|---|---|---|---|
| 5,198,680 A | * | 3/1993 | Kurakake | 250/505.1 |
| 5,206,512 A | * | 4/1993 | Iwao | 250/363.05 |
| 5,434,416 A | * | 7/1995 | Motomura et al. | 250/369 |
| 5,602,395 A | * | 2/1997 | Nellemann et al. | 250/363.03 |
| 5,929,446 A | * | 7/1999 | Plummer et al. | 250/363.05 |
| 6,693,291 B2 | * | 2/2004 | Nelson et al. | 250/505.1 |

\* cited by examiner

*Primary Examiner*—Albert Gagliardi
(74) *Attorney, Agent, or Firm*—Finnegan, Henderson, Farabow, Garrett & Dunner, L.L.P.

(57) ABSTRACT

The invention relates to a method of imaging a target organ in a patient by SPECT, by using a gamma camera having a gamma detector, and by computer reconstructing the distribution of the radioactivity inside the patient's body from planar images, acquired along at least one linear orbit performed in a transverse direction, wherein said gamma detector is perpendicularly provided on its outer surface with a plurality of collimator septa in a mutually parallel arrangement and with at least one raised wall, extending in the longitudinal direction of the detector, transversely positioned to said septa and with a substantial portion extending beyond said septa, said wall and said septa together forming a so-called rake collimator.

The invention further relates to said rake collimator as such and to a combination of a gamma detector and a rake collimator.

The invention also relates to an equipment for performing the above method.

15 Claims, 4 Drawing Sheets

METHOD OF IMAGING BY SPECT

The invention relates to a method of imaging a target organ in a patient by SPECT, by using a gamma camera having a gamma detector, and by computer reconstructing the distribution of the radioactivity inside the patient's body from the planar images, acquired along at least one linear orbit performed in a transverse direction, wherein said gamma detector is perpendicularly provided on its outer surface with a plurality of collimator septa in a mutually parallel arrangement.

The Single Photon Emission Computed Tomography (SPECT) is routinely used in clinical studies. SPECT is performed by using a gamma camera, comprising a collimator fixed on a gamma detector, which gamma camera follows a revolution orbit around the patient's body. The gamma rays, emitted by a radioactive tracer, accumulated in certain tissues or organs of the patient's body, are sorted by the collimator and recorded by the gamma detector under various angles around the body, the collimator always pointing to (facing) the rotation axis of the camera. From the acquired planar images the distribution of the activity inside the patient's body can be computed using certain reconstruction algorithms. Generally the so-called Expectation-Maximization of the Maximum-Likelihood (EM-ML) algorithm is used, as described by Shepp et al. (IEEE Trans. Med. Imaging 1982; 2:113–122) and by Lange et al. (J. Comput. Assist. Tomogr. 1984; 8:306–316). This iterative algorithm minimizes the effect of noise in SPECT images.

The collimators nowadays in use are manufactured from a lead sheat perforated with a plurality of usually parallel holes. The collimator is the most problematic element of the SPECT device, with regard to its poor sensitivity (less than 0.01% of the gamma radiation passes the collimator and reaches the detector) and its poor spatial resolution, becoming increasingly worse with increasing distance between activity source (i.e. the organ or tissue wherein the radioactivity has been accumulated) and collimator. Improvement of one of these properties, e.g. by modifying the hole length or diameter of the collimator, is always to the detriment of the other one. Furthermore, the SPECT technique is inadequate in producing reliable images because of the fact that small fluctuations in the acquired data can involve significant variations in the reconstructed images. This is due to the geometry of the acquired data. The limited time available for obtaining the necessary information (because of the restricted fixation time of the patient and the decay time of the radioactive tracer) and the limited injected radioactivity dose (limited for health care reasons) lead to acquired images containing statistical noise. Indeed the measurement of a radioactive process follows the Poisson law, giving a signal to noise ratio proportional to the square root of the count rate. As a result, the reconstructed images are frequently corrupted by significant false positive information, so-called noise artifacts. Consequently, it is a major goal in SPECT imaging to increase the SPECT sensitivity without reduction of the spatial resolution in order to improve the acquired signal to noise ratio.

According to Int. patent appln. publ. No. WO 99/09431, the sensitivity-resolution couple of the collimator can be improved substantially by using a fan-beam collimator, focusing to a focal line parallel to the patient's body length, which focal line is made to travel throughout the target organ during the acquisition of the images. This acquisition is performed along one or a plurality of linear orbits in a direction perpendicular to the patient's body length. In this arrangement the above sensitivity-resolution couple could be improved with a factor of up to approx. 3.

Although the method of SPECT imaging, as described in the above patent application, results in effect is not completely satisfactory. The manufacture of a fan-beam collimator, suitable for the method of SPECT imaging in question, is difficult, hence time-consuming and expensive.

Therefore it is the objective of the present invention to provide a method of imaging by SPECT by using a better accessible equipment, while maintaining the favourable results obtained by applying the method as described in the above Int. patent application.

This objective can be achieved by a method as defined in the opening paragraph, viz. a method of SPECT imaging a target organ in a patient, by using a gamma camera having a gamma detector, and by computer reconstructing the distribution of the radioactivity inside the patient's body from planar images, acquired along at least one linear orbit performed in a transverse direction, wherein said gamma detector is perpendicularly provided on its outer surface with a plurality of collimator septa in a mutually parallel arrangement, which method is characterized, according to the present invention, in that the gamma detector is additionally provided on its outer surface with at least one raised wall, extending in the longitudinal direction of the detector, transversely positioned to said septa and with a substantial portion extending beyond said septa, said wall and said septa together forming a so-called rake collimator.

In the above method the usable transverse size dimension of the SPECT device can be fully used, i.e. the target organ size has to be equal at most to the detector transverse size, to acquire a complete set of planar images (i.e. sufficient to reconstruct the activity distribution).

Surprisingly it has been found, that by using in the above tomographic method a collimator with said at least one raised wall, outwards extending from the gamma detector's outer surface, i.e. the surface facing the patient during use, a considerable improvement of the sensitivity-resolution couple can be obtained, even a further improvement with regard to that described in the above WO 99/09431. The construction of such a collimator, provided with at least one raised wall in a transverse position with regard to the collimator septa, is very simple and therefore a cheap substitute for the special fan-beam collimator to be used in WO 99/09431. This simple construction, as used in the present invention, gives even superior results with regard to that described in the above int. patent application. Therefore better reconstructed images can be obtained by using the same acquisition time and the same dose of injected radioactivity. In this manner lesions or other malignancies in the body of a patient can be detected earlier, for example, metastasation of tumours in an early stage of development. At choice, however, the acquisition time can be reduced considerably to obtain, with the same dose of injected radioactivity, images suitable for routine investigations. This results in a reduction of the costs for the clinic or hospital. Also at choice, as a third alternative the dose of injected radioactivity can be reduced in order to burden the patient to a lesser extent. Optionally these advantages can be reached in combination with each other, then, of course, to a somewhat lesser extent but nevertheless with sufficiently attractive prospects.

Preferably, in the method of the present invention, the longitudinal length of the gamma detector (=the length of said raised wall) is larger than the thickness of the transverse slices of the patient's body to be imaged and reconstructed.

It should be emphasized, that by the term "target organ" is meant the organ or tissue to be studied or investigated by using the method of the invention. The term "target organ"

obviously encompasses a plurality of organs to be studied simultaneously and also a part of the body, like the head, the chest or the abdomen, or even the complete body of the patient.

It is further important to note, that the linear orbits must not necessarily be straight lines, but also encompass slightly curved lines. The expression "linear orbit" therefore also encompasses in this connection "substantially linear orbit".

Preferably the gamma detector is outwards provided with one or two raised walls. In case the gamma detector is provided with a single raised wall, this wall preferably extends perpendicularly from the outer surface of the detector in such manner that it divides this surface into two equal or approximately equal portions.

In case the gamma detector is provided with two raised walls, these walls are preferably positioned at both outer edges of the detector and slanted inwards to form, in cross section, the sides of a trapezium with a topline-length of from approx. 3 to approx. 12 mm.

To improve their results, gamma cameras for SPECT imaging are often adapted to the special organs to be studied (organ-dedicated), for example, head-dedicated equipment for specific study of the head (by using an annular camera), etc. The heigth of the septa is normally 3 or 4 cm. If in the method of the invention head-dedicated cameras are preferred, such cameras have only to be equipped with rake collimators, having said at least one raised wall extending beyond said septa over a distance of approx. 8 or 9 cm, measured perpendicularly with respect to the outer surface of the detector. The method of the present invention, however, gives so much better reconstructed images, that this method is well applicable for the whole body of a patient as well as for only a part of the body, e.g. the head, without adverse effects on the quality of these images. Therefore, the method of the invention can be considered as universally applicable or allround, in that rake collimators, having said at least one raised wall extending beyond said septa over a maximum distance of approximately 26 cm, preferably of between 16 and 22 cm, measured perpendicularly with respect to the outer surface of the detector, can be used generally, i.e. both for the whole body and for organ-dedicated SPECT imaging.

The above raised wall should be manufactured from a suitable material, preferably from a high-attenuating material, such as tungsten, lead, gold, tantalum, platinum or iridium. From a cost-performance point of view, tungsten is extremely suitable for this purpose.

To reach superior results, the images are preferably acquired by the method of the present invention along four linear orbits which are performed in mutually transverse directions, i.e. perpendicular to the patient's body.

It has been observed, that the quality of the reconstructed images can further be improved, if during the acquisition said at least one raised wall of the rake collimator remains parallel to its initial position along each orbit. This can easily be reached by shifting said rake collimator during the acquisition accurately over the patient's body, or vice versa. It is also important to note, that during the acquisition the rake collimator should have a relative motion to the target tissue, the gamma detector optionally being in rest relative to the target or having its own relative motion.

The method according to the present invention is not restricted to the use of a single gamma detector provided with a rake collimator (detector-collimator combination), but also encompasses the use of up to four detector-collimator combinations, in particular of two and four combinations. More gamma cameras can be used in that case or, if desired, a two-headed or four-headed camera, i.e. a camera with two or four detector-collimator combinations. If a second detector-collimator combination is applied, this combination is used, simultaneously with and positioned opposite to the first one, sandwiching the patient in between.

If the use of four detector-collimator combinations is preferred, two couples of mutually opposite gamma detector-collimator combinations are used simultaneously and in mutually perpendicular position, both couples sandwiching the patient in between; the images are acquired by moving each of the detector-collimator combinations along a linear orbit.

It has been observed, that by using a plurality of detector-collimator combinations, in particular two or four, according to the present invention, simultaneously following the various linear orbits, the sensitivity of the SPECT device can further be improved, resulting in still better reconstructed images.

According to the present invention, it has further been found, that the distribution $A(x,y,z)$ of the radioactivity in the patient's body can be computed by using the following new reconstruction algorithm (this is in fact the mathematical proof that the acquired set of planar images is complete, i.e. sufficient to reconstruct the distribution activity):

$$A(x, y, z) = \frac{1}{(2\pi)^2 f} \sum_{\alpha=1}^{n_\alpha} \int_{-f}^{f} dr \, \tilde{P}_\alpha\left(\frac{r}{f}(x\cos\theta_\alpha + y\sin\theta_\alpha) + (-x\sin\theta_\alpha + y\cos\theta_\alpha), r, z\right)$$

wherein:

$$\tilde{P}_\alpha(W, r, z) = \frac{1}{2\pi}\int_{-\infty}^{+\infty} dk e^{ikW}|k|e^{-ikU_\alpha \frac{r}{f}}\int_{-\infty}^{+\infty} dV e^{-ikV} P'_\alpha(V, r, z)$$

and:

$$P'_\alpha(V, r, z) = +\frac{dP_\alpha(V, r, z)}{dV} \quad \text{if } r \geq 0$$
$$= - \quad \text{if } r < 0$$

wherein:

x, y and z are the orthogonal coordinates along the horizontal transverse direction, the vertical transverse direction and the longitudinal direction, respectively;

$P_\alpha(V,r,z)$ are the planar images pixels values, where r is the coordinate along the transverse direction of the detector and V is the detector position along the linear orbit α;

f is the length of the raised wall;

$n_\alpha$ is the number of linear orbits used;

$Q_\alpha$ is the angle between the x axis and the direction of orbit α;

$U_\alpha$ is the shift length of the raised wall's outer edge (extremity) in the linear orbit a versus the origin of the axis coordinate (x=0,y=0);

k is the spatial frequency in the Fourrier space; and

W is an arbitrary working variable.

In case in the method of the present invention a rake collimator is used having two inwardly slanted raised walls, as defined hereinbefore, in the above algorithm the following simplification can be made:

$$P'_\alpha(V, r, z) = P_\alpha(V, r, z)$$

The limit [−f,f] in the integration dr shows that the transverse size of the detector must be greater than two times the length of the raised wall, according to the above algorithm. It is also important to point out that $P_\alpha'(V,r,z)$ vanishes when the target organ does no longer intersept the rake collimator acceptance angle, and thus the integration dV, and as a result also the acquisition orbit range can be reduced, allowing an increasing acquisition time per planar image, i.e. an increasing sensitivity, for a same total acquisition time.

The above algorithm is the exact reconstruction of the acquired images under the assumption that the gamma detector resolution, the gamma attenuation and the gamma scatter can be neglected. if these effects should be taken into account, certain well-known iterative algorithms, like EM-ML (see hereinbefore) can additionally be used for reconstruction purposes.

The invention also relates to a collimator to be used in the method of the present invention, as disclosed hereinbefore. Such a so-called rake collimator comprises, in addition to a plurality of collimator septa in a mutually parallel arrangement, at least one raised wall, transversely positioned to said septa and with a substantial portion extending beyond said septa.

In a preferred embodiment, said rake collimator of the present invention comprises either a single raised wall, perpendicularly extending from a common central line of said septa, or two raised walls, slanted inwards from the ends of said septa to form, in cross section, the sides of a trapezium with a topline-length of from approx. 3 to approx. 12 mm.

Further the present invention relates to a combination of a gamma detector and a rake collimator, as defined above, and to a gamma camera, provided with a combination of a gamma detector and said above-defined collimator.

The invention finally relates to an equipment for performing the above method of SPECT imaging according to the invention, comprising at least one gamma camera with at least one detector-combined collimator, and a bed for a patient to be examined in such a relative position, that the bed is surrounded by four collimator positions, essentially situated at the angular points of a square (which are only for simplicity reasons chosen to be situated over the bed (a), under the bed (b), and on both sides (c) and (d) of the bed), which positions can be occupied by said at least one collimator. The patient to be examined is fixedly positioned on a bed. According to the present invention, the equipment for performing the above method of imaging by SPECT is characterized in that:

said detector-combined collimator is a rake collimator as defined hereinbefore, having its at least one raised wall parallel to the bed length;

the bed is positioned at such a distance from the collimator positions, that in each position the outer edge (extremity) of said collimator's raised wall is approx. 5 cm distanced at most from the patient's body on the bed; and the bed is adapted to allow movements vis-à-vis said at least one collimator in two perpendicular directions, both transverse to the bed length, viz. a sideward movement at position a or b of said at least one collimator and an up and downward movement at position c or d thereof; or, alternatively, said at least one collimator is adapted to allow movements vis-à-vis the bed in perpendicular directions, all transverse to the bed length, viz. substantially parallel to the bed surface in the positions a and b, and substantially perpendicular to the bed surface in the positions c and d.

The outer edge (extremity) of said collimator's raised wall should be positioned as close as possible to the patient's body, to improve the sensitivity and resolution of the system. The minimum distance between said extremity and said body depends on the portion of the body (or on the organ) to be examined, but is generally less than approx. 5 cm, preferably, however, approx. 1 cm at most. By positioning the bed at such a distance from the rake collimator positions (this positioning can be adjusted by a computer, preferably by the acquisition computer), in each of these positions the rake collimator's raised wall remains as closest as possible to the patient's body on the bed during the acquisition by the gamma camera along linear orbits. By adapting the bed or the rake collimator in such manner that it allows relative perpendicularly directed movements, as described above, images can be acquired by the gamma camera along four linear orbits performed in mutually transverse directions perpendicular to the patient's body.

The range of the relative movements of the bed vis-à-vis the collimator or collimators should preferably be at least equal to two times the transverse size of the detector or collimator. The rake collimator(s) forming part of the equipment of the invention has (have) advantageously at least one raised wall, extending beyond the collimator septa over a distance of between approx. 8 and approx. 26 cm. If allround, i.e. not dedicated to the imaging of certain target organs or parts of the body like the head, this length is preferably between 16 and 22 cm (see above).

It should be emphasized that by the expression "at least one" should be understood: one up to four; more in particular: one, two or four.

So the equipment according to the present invention may conveniently comprise one gamma detector provided with a rake collimator. Such a detector-collimator combination is equipped in such manner that it can be moved from the above-defined position a to positions c, b and d, successively, and vice versa.

It may be of advantage, however, to include a second gamma detector provided with a rake collimator into the equipment of the present invention. In that case the two detector-collimator combinations are positioned opposite to each other, sandwiching bed plus patient in between, both equipped in such manner that they can be moved from position a to position c, and from position b to position d, respectively, and vice versa.

In case one or two detector-collimator combinations are present in the equipment of the invention, the equipment is preferably so adapted that the bed is movable vis-à-vis the collimator by means of a system of motive members, preferably a combination of a horizontally shifting mobile member at the foot of the bed and a jack for moving the bed into a vertical direction. This system of motive members is explained in more detail in the Examples.

In an equally advantageous embodiment the equipment of the present invention comprises four gamma detectors with rake collimators, which detector-collimator combinations are so positioned that they occupy positions a, b, c and d, respectively, thereby sandwiching bed plus patient in between.

In this embodiment the four detector-collimator combinations are preferably movable vis-à-vis the bed by means of a motive system, preferably a rigid frame of four mutually perpendicular rails, positioned transversally to the bed length, along which the detector-collimator combinations can slide. This motive system is also explained in the Examples.

It is another merit of the equipment of the present invention that the relative movements of the bed vis-à-vis the detector-collimator combination(s) can be computer controlled (cybernation) by the gamma camera. This advanced system of computer-driven detector-collimator combination(s) relative to the patient's bed, in which the relevant above algorithm is conveniently used, enables the user of the system, i.e. the personnel of the clinic or hospital, to examine the patient full-automatically by the improved SPECT imaging technique of the invention.

EXAMPLES

The invention will now be described in greater detail with reference to the accompanying drawings, wherein.

Figure 4:
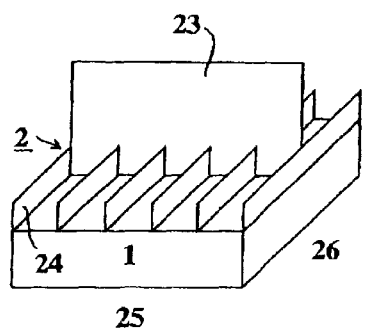
Figure 5:
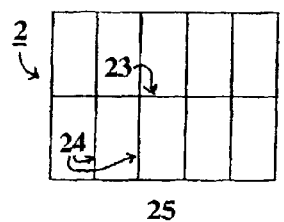
Figure 6:
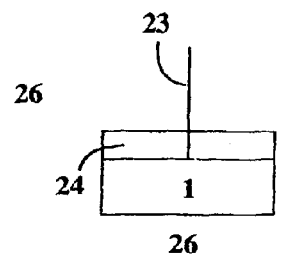
Figure 7:
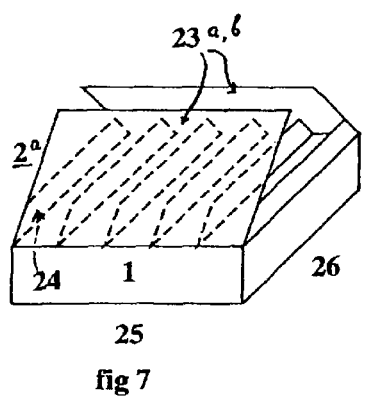
Figure 8:
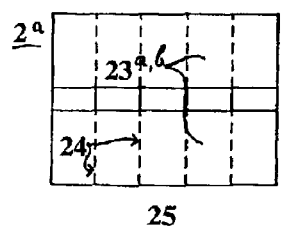
Figure 9:
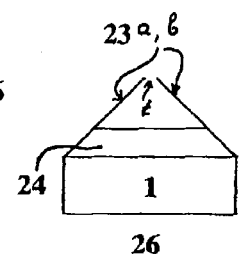
Figure 10:
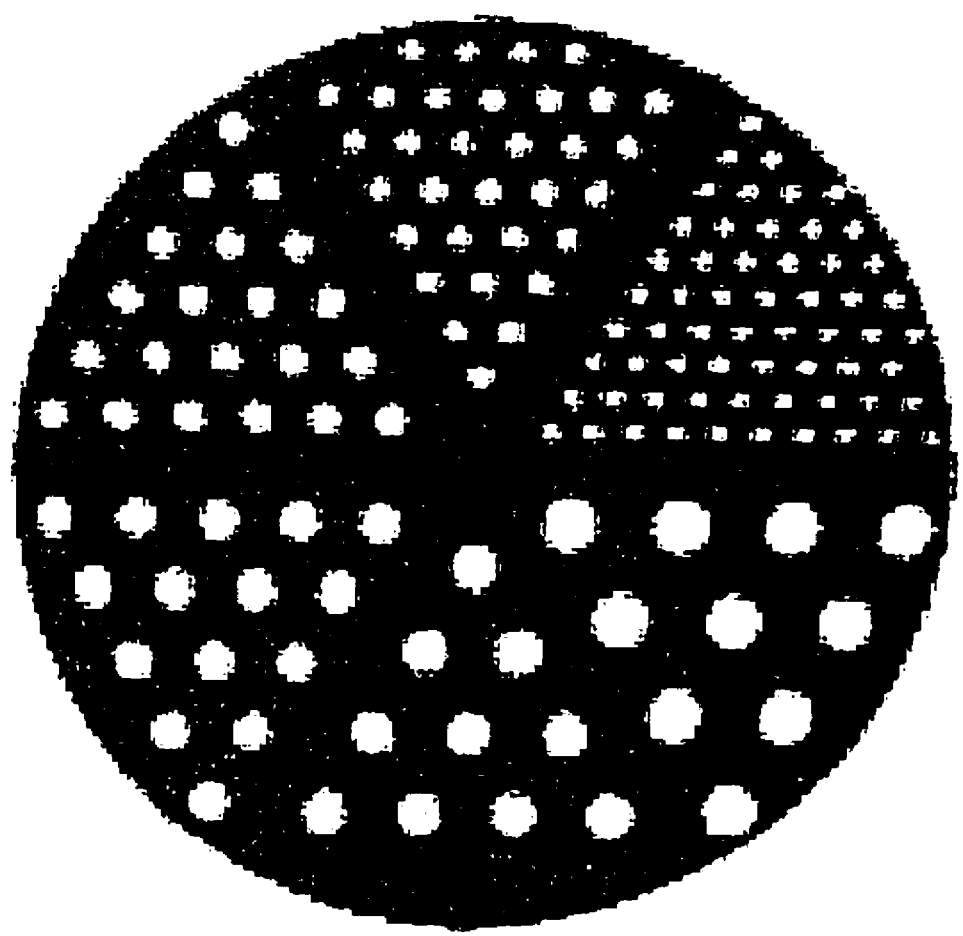

FIGS. 4 through 9 show two suitable embodiments of a gamma detector equipped with a rake collimator to be used in the above equipment, FIGS. 4 and 7 in perspective view, FIGS. 5 and 8 viewed from above, and FIGS. 6 and 9 in side-view; and FIG. 10 shows a SPECT spatial revolution image, obtained by performing a model experiment.

DETAILED DESCRIPTION OF THE DRAWINGS

Figure 1:
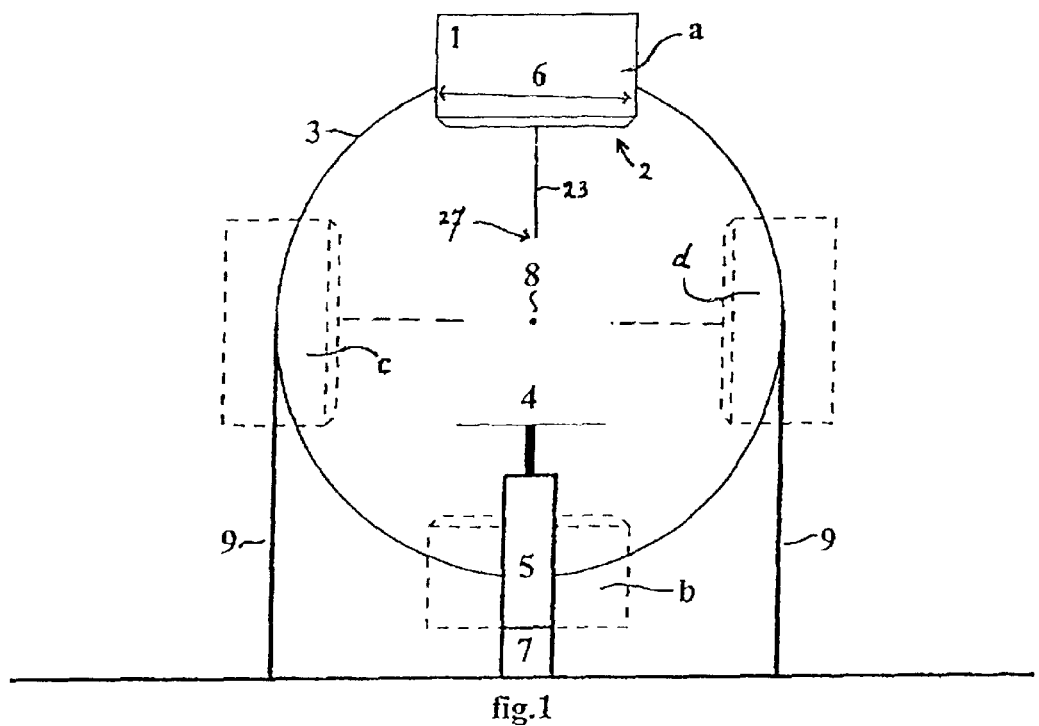
FIGS. 1 and 2 are schematic representations of the equipment according to the present invention in a suitable embodiment, FIG. 1 viewed in the longitudinal direction of the bed and FIG. 2 viewed in a direction transverse to the bed.
Figure 2:
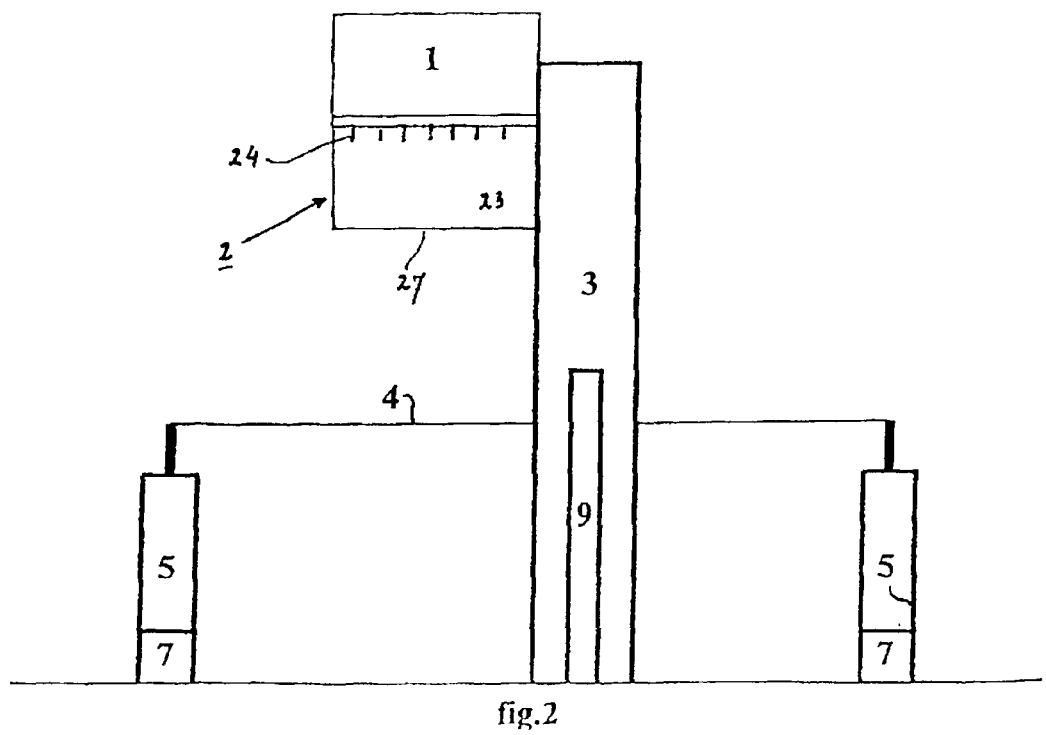

FIGS. 1 and 2 show a gamma detector 1 equipped with a rake collimator 2, comprising a plurality of collimator septa 24 and a raised wall 23, as described hereinafter. The detector-collimator combination is movably attached to a circular rail 3 head by two pylons 9. The detector 1 can move along the rail, the longitudinally positioned raised wall 23 of the collimator 2 always pointing to the rotation axis 8. Using a magnetic brake, the detector 1 can be positioned over, under, left and right of the bed 4: positions a, b, c and d, respectively (the collimator centers are situated at the angular points of a square). A motor attached to the detector 1 and drawing an endless screw acting on a circular rack attached along the rail 3 can be used to move the detector-collimator combination from one position into another. The bed 4 can vertically move thanks to the jacks 5, which can be constituted by a motorized endless screw acting on a rack. A crenelated plate drawing by the endless screw and inserted in an optical switch can be used to adjust the vertical position of the bed 4. This bed can also move along the left—right direction of FIG. 1 (horizontal transverse direction) thanks to the mobile element 7 which can be a trolley rolling along a rail on the floor. Again a motorized endless screw acting on a rack and drawing a crenelated plate inserted in an optical switch can be used to move and adjust the transverse horizontal bed 4 position. The vertical positioning range of the bed 4 vis-à-vis the rotation axis 8 should be optimal with respect to the equipment used, the horizontal positioning range is at least equal to two times the transverse size 6 of the detector 1. The raised wall 23 is parallel to the bed 4 length and points to the rotation axis 8, said axis corresponding with a central line through the patient's body on the bed 4. The distance between the outer edge (extremity) 27 of the raised wall 23 and the body surface is as small as possible, preferably approx. 1 cm at most. The planar images are digitally acquired along four linear paths or orbits: the bed 4 is moved into various successive vertical positions, when the detector 1 is unmoved left or right of the bed 4 (in positions c or d, respectively); the bed is moved into various successive transverse horizontal positions, when the detector 1 is unmoved over or under the bed 4 (in positions a or b, respectively). During acquisition, the digital planar images and the vertical and horizontal digital bed 4 positions are sent to the treatment computer. The distribution of the radioactivity over the patient's body A(x,y,z) wherein x,y and z are the orthogonal coordinates along the horizontal transverse direction, the vertical direction and the longitudinal direction, respectively, can be computed using the new reconstruction algorithm as disclosed thereinbefore. A second detector—rake collimator combination may be present in position b of the above equipment, movable along the rail 3 from position b to position d and vice versa, whereas the first combination is then movable from position a to position c and vice versa.

Figure 3:
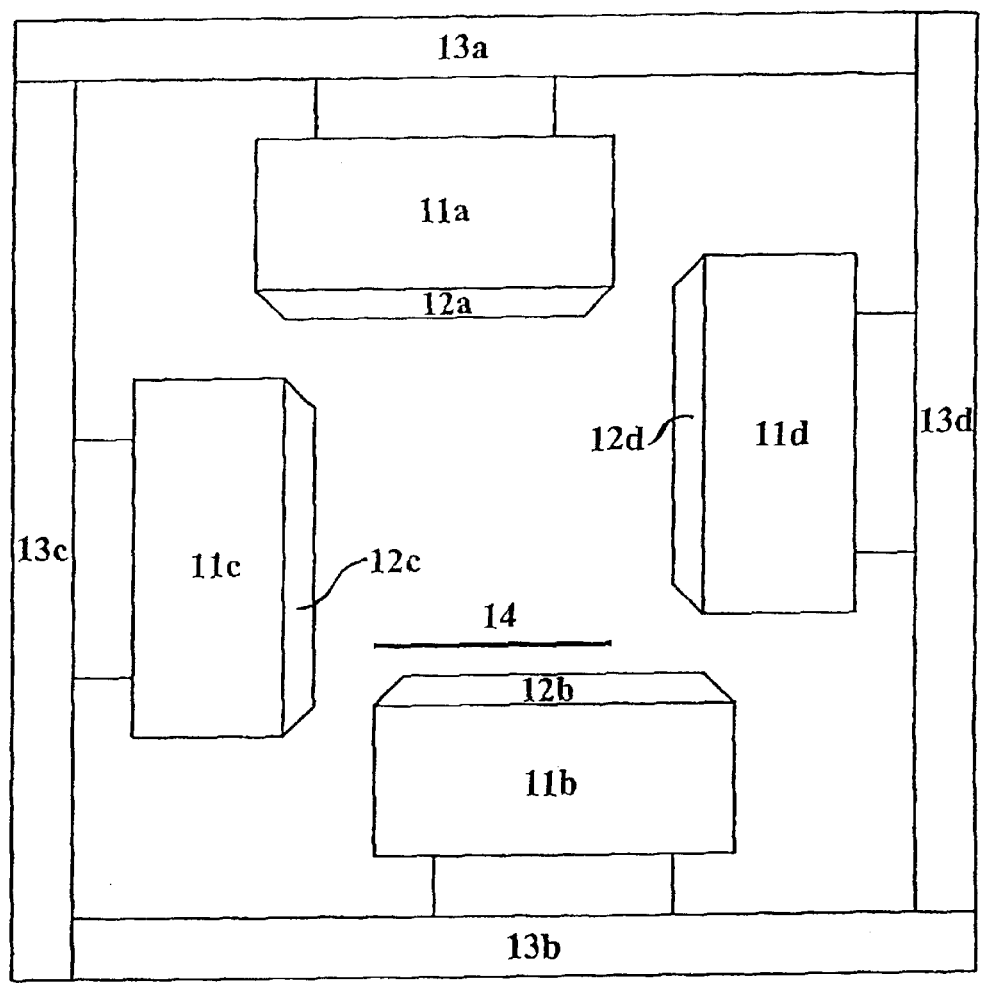
FIG. 3 is also a schematic representation of such an equipment of the present invention, now in another suitable embodiment, viewed in the longitudinal direction of the bed, as in FIG. 1.

The embodiment shown in FIG. 3 comprises four gamma detectors 11a, 11b, 11c and 11d, provided with rake collimators 12a, 12b, 12c and 12d (raised walls not shown), situated over, under, left and right the bed 14 (positions a, b, c and d, respectively). Each detector can be moved along a rail (13a, 13b, 13c and 13d), perpendicular to the bed 14 length; the rails are attached to each other to constitute a rigid frame.

During the acquisition the detector-collimator combinations move along their rails, the bed being unmoved.

FIGS. 4 through 9 show schematically a gamma detector 1 with two different rake collimators 2 and 2a in more detail. The rake collimator of FIGS. 4–6 is composed of a raised wall 23, parallel to the longitudinal direction 25 of the detector, and of a plurality of collimator septa 24, perpendicular to the raised wall and parallel to the transverse direction 26 of the detector. The heigh of the collimator septa is approx. 3 or 4 cm, that of the raised wall approx. 20–25 cm, both measured from the outer surface of the gamma detector.

The rake collimator of FIGS. 7–9 is, in addition to the collimator septa 24, provided with two raised walls 23a,b, positioned at both outer edges of the detector and slanted inwards. In cross section (FIG. 9) these raised walls form the sides of a trapezium with a topline-length t of between 3 and 12 mm.

The raised walls are manufactured from tungsten. The outer edges of the raised walls 23 and 23a,b extend from the outer surface of the gamma detector 1 over a distance of approx. 20 to 25 cm, measured perpendicularly with respect to said outer surface. The collimator septa extend from said detector's outer surface over a distance of approx. 3 or 4 cm.

Description of the Model Experiment

To acquire real acquisition data, a model experiment has been carried out. In such an experiment the following requirements as to the equipment should be met:

(a) camera plus suitable rake collimator;

(b) suitable radiation source; and (c) camera plus collimator should be movable vis-à-vis the radiation source or vice versa.

Ad (a). A suitable rake collimator, meeting the requirements of the present invention, namely a collimator corresponding to the FIGS. 4–6 embodiment, has been manufactured. The raised wall, made of tungsten, extends from the outer surface of the gamma detector over a distance of 20 cm. The NaI crystal spatial resolution of the detector is 3 mm.

Ad (b). As the radiation source is used a so-called Jaszczak's de luxe phantom, well-known in the art of performing radioactive experiments.

Ad (c). The radiation source is movable relative to the collimator in such manner that it enables the acquisition of images along linear orbits performed in two directions x and y (horizontal and vertical), perpendicular to the SPECT camera rotation axis z.

In the above arrangement, the method of the present invention is performed with the radiation source situated at a distance of less than 1 cm from the rake collimator's outer edge (extremity). After a suitable acquisition time, the SPECT spatial resolution of FIG. 10 is obtained.

From this figure it can be concluded, that the spatial resolution obtained according to the method of the invention is surprisingly good, without any degradation at increasing distance from the collimator.

What is claimed is:

1. A method of imaging a target organ in a patient by SPECT, by using a gamma camera having a gamma detector/rake collimator combination including a gamma detector perpendicularly provided on its outer surface with a plurality of collimator septa in a mutually parallel arrangement, said method comprising:
   focusing the collimator to a focal line parallel to the patient's body length, wherein said rake collimator includes in addition to said septa at least one raised wall, provided on the outer surface of the gamma detector and extending in the longitudinal direction thereof, said raised wall being transversely positioned with respect to said septa with a substantial portion extending beyond said septa;
   acquiring planar images by relative movement between the gamma camera and the patient's body along at least one linear path in a direction perpendicular to the patient's body length; and
   reconstructing with a computer the distribution of radioactivity inside the patient's body from the acquired planar images.

2. The method of claim 1, wherein the rake collimator is provided with a single raised wall, perpendicularly extending from the outer surface of the gamma detector in such a manner that it divides this surface into two equal or approximately equal portions.

3. The method of claim 1, wherein the rake collimator is provided with two raised walls, positioned at both outer edges of the gamma detector and slanted inwards to form, in cross section, the sides of a trapezium with a topline-length of from about 3 to 12 mm.

4. The method of claim 1, wherein said at least one raised wall extends beyond said septa over a distance of between about 8 and about 26 cm, measured perpendicularly with respect to the outer surface of the gamma detector.

5. The method of claim 1, wherein said at least one raised wall is of a high-attenuating material.

6. The method of claim 1, wherein the images are acquired along four linear paths performed in mutually transverse directions.

7. The method of claim 1, wherein during the acquiring of the planar images the rake collimator remains parallel to its initial position along each path.

8. The method of claim 1, wherein a second gamma detector/rake collimator combination is used simultaneously with and in a position opposite to the first gamma detector/rake collimator combination, sandwiching the patient in between.

9. The method of claim 8, wherein additional gamma detector/rake collimator combinations are used simultaneously with and in a position perpendicular to the second combination, equally sandwiching the patient in between, and the images are acquired by moving each of the gamma detector/rake collimator combinations along a linear path.

10. The method of claim 1, wherein the following reconstruction algorithm is used for computing a reconstructed radioactivity distribution A(x, y, z):

$$A(x, y, z) = \frac{1}{(2\pi)^2 f} \sum_{\alpha=1}^{n_\alpha} \int_{-f}^{f} dr \, \tilde{P}_\alpha\left(\frac{r}{f}(x\cos\theta_\alpha + y\sin\theta_\alpha) + (-x\sin\theta_\alpha + y\cos\theta_\alpha), r, z\right)$$

wherein:

$$\tilde{P}_\alpha(W, r, z) = \frac{1}{2\pi} \int_{-\infty}^{+\infty} dk \, e^{ikW} |k| e^{-ikU_\alpha \frac{r}{f}} \int_{-\infty}^{+\infty} dV \, e^{-ikV} P'_\alpha(V, r, z)$$

and:

$$P'_\alpha(V, r, z) = +\frac{dP_\alpha(V, r, z)}{dV} \quad \text{if } r \geq 0$$
$$= - \quad \text{if } r < 0$$

wherein:
   x, y and z are the orthogonal coordinates along the horizontal transverse direction, the vertical transverse direction and the longitudinal direction, respectively;
   Pα(V,r,z) are the planar images pixels values, where r is the coordinate along the transverse direction of the detector and V is the detector position along the linear path α;
   f is the length of the raised wall;
   $n_\alpha$ is the number of linear paths used;
   $Q_\alpha$ is the angle between the x axis and the direction of path α;
   $U_\alpha$ is the shift length of the raised wall's outer edge in the linear path α versus the origin of the axis coordinate (x=0, y=0);
   k is the spatial frequency in the Fourrier space; and
   W is an arbitrary working variable.

11. The method of claim 10, wherein $$P'_\alpha(V, r, z) = P_\alpha(V, r, z).$$

12. Apparatus for imaging a target organ in a patient by SPECT, comprising:
   at least one gamma camera having at least one gamma detector/rake collimator combination including a gamma detector perpendicularly provided on its outer surface with a plurality of collimator septa in a mutually parallel arrangement;
   a bed for a patient to be examined and having a bed length;
   means for defining four gamma detector/rake collimator combination positions located respectively at the corners of a square, and including a first position over the bed, a second position under the bed, a third position on one side of the bed, and a fourth position on the side of the bed opposite the third position, the at least one gamma detector/rake collimator combination being positionable at all of the first, second, third, and fourth positions;

at least one raised wall on the rake collimator transversely positioned with respect to said septa and with a substantial portion extending beyond said septa, said at least one wall being parallel to the bed length;

means for positioning the bed at such a distance from the gamma detector/rake collimator combination positions, that in each position the outer edge of said rake collimator's raised wall is about 5 cm distanced at most from the patient's body on the bed; and means for moving the bed relative to said gamma detector/rake collimator combination in two perpendicular directions, both transverse to the bed length to effect a sideward movement at the first and second positions and upward and downward movement at the third and fourth positions.

13. Apparatus for imaging a target organ in a patient by SPECT, comprising:

at least one gamma camera having at least one gamma detector/rake collimator combination including a gamma detector perpendicularly provided on its outer surface with a plurality of collimator septa in a mutually parallel arrangement;

a bed for a patient to be examined and having a bed length;

means for defining four gamma detector/rake collimator combination positions located respectively at the corners of a square, and including a first position over the bed, a second position under the bed, a third position on one side of the bed, and a fourth position on the side of the bed opposite the third position, the at least one gamma detector/rake collimator combination being positionable at all of the first, second, third, and fourth positions;

at least one raised wall on the rake collimator transversely positioned with respect to said septa and with a substantial portion extending beyond said septa, said at least one wall being parallel to the bed length;

means for positioning the bed at such a distance from the gamma detector/rake collimator combination positions, that in each position the outer edge of said rake collimator's raised wall is about 5 cm distanced at most from the patient's body on the bed; and means for moving the at least one gamma detector/rake collimator combination relative to said bed in two perpendicular directions, both transverse to the bed length to effect a sideward movement at the first and second positions and an upward and downward movement at the third and fourth positions.

14. The apparatus of claim 13, wherein one gamma detector/rake collimator combination is provided and including means for moving the gamma detector/rake collimator combination from the first position to the second, third, and fourth positions successively.

15. The apparatus of claim 13, wherein two gamma detector/rake collimator combinations are provided, which gamma detector/rake collimator combinations are positioned opposite to each other, sandwiching the bed plus the patient in between, and including means for moving one combination between the first position and the third positions, and the other combination between the second position and the fourth position.

* * * * *

UNITED STATES PATENT AND TRADEMARK OFFICE
CERTIFICATE OF CORRECTION

PATENT NO. : 6,967,331 B2
DATED : November 22, 2005
INVENTOR(S) : Adrianus A. Van Dulmen et al.

It is certified that error appears in the above-identified patent and that said Letters Patent is hereby corrected as shown below:

Title page,
Insert Item -- [30] Foreign Application Priority Data
EP     00200130.3     January 14, 2000 --.

Column 10,
Line 44, "$n_\alpha$is" should read -- $n_\alpha$ is --.
Line 45, "$Q_\alpha$is" should read -- $Q_\alpha$ is --.
Line 47, "$U_\alpha$is" should read -- $U_\alpha$ is --.

Signed and Sealed this

Fourteenth Day of February, 2006

JON W. DUDAS
*Director of the United States Patent and Trademark Office*